(12) United States Patent
Komiya

(10) Patent No.: US 6,510,208 B1
(45) Date of Patent: Jan. 21, 2003

(54) TELEPHONE APPARATUS WITH AUDIO RECORDING FUNCTION AND AUDIO RECORDING METHOD TELEPHONE APPARATUS WITH AUDIO RECORDING FUNCTION

(75) Inventor: Kozo Komiya, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/009,237

(22) Filed: Jan. 20, 1997

(30) Foreign Application Priority Data

Jan. 20, 1997 (JP) .............................. 9-007674

(51) Int. Cl.[7] .............................................. H04M 1/65
(52) U.S. Cl. ...................................... 379/88.1; 455/412
(58) Field of Search ............................ 379/88.1, 88.28, 379/93.08, 88.16, 88.22, 88.08; 455/412, 413; 704/220, 221, 222, 223, 229, 230

(56) References Cited

U.S. PATENT DOCUMENTS

| | | | | |
|---|---|---|---|---|
| 5,195,091 A | * | 3/1993 | Farwell et al. | 370/336 |
| 5,311,575 A | * | 5/1994 | Oh | 379/88 |
| 5,420,912 A | * | 5/1995 | Kopp et al. | 379/634 |
| 5,483,577 A | * | 1/1996 | Gulick | 379/67 |
| 5,506,872 A | * | 4/1996 | Mohler | 379/88 |
| 5,675,333 A | * | 10/1997 | Boursier et al. | 379/88 |
| 5,742,734 A | * | 4/1998 | DeJaco et al. | 704/219 |
| 5,761,275 A | * | 6/1998 | Irie | 379/88 |
| 5,774,856 A | * | 6/1998 | Haber et al. | 379/88 |
| 5,867,793 A | * | 2/1999 | Davis | 455/556 |
| 5,933,803 A | * | 8/1999 | Ojala | 704/216 |
| 5,978,757 A | * | 11/1999 | Newton | 379/88 |
| 5,995,824 A | * | 11/1999 | Whitfield | 455/412 |
| 6,021,325 A | * | 2/2000 | Hall | 455/412 |
| 6,064,876 A | * | 5/2000 | Ishida et al. | 455/412 |
| 6,084,851 A | * | 7/2000 | Iwasaki | 370/204 |
| 6,122,311 A | * | 9/2000 | Watanabe et al. | 375/147 |
| 6,138,036 A | * | 10/2000 | O'Cinneide | 455/557 |
| 6,226,532 B1 | * | 5/2001 | Kim et al. | 455/563 |
| 6,313,734 B1 | * | 11/2001 | Weiss et al. | 340/7.29 |

* cited by examiner

*Primary Examiner*—Scott L. Weaver
(74) *Attorney, Agent, or Firm*—Jay H. Maioli

(57) ABSTRACT

A memory for voice memo is provided. A digital audio signal is stored into the memory in a form in which the signal was compression encoded by a variable length code. Thus, a data amount which is required for the voice memo is reduced and the improvement of the recording time and the reduction of the memory capacity can be realized without deteriorating the sound quality. The audio signal is compressed by a system similar to a compression system of a CDMA system and stored into the memory. Thus, there is no need to add any special circuit and a circuit scale and costs are not increased.

4 Claims, 2 Drawing Sheets

| PACKET TYPE | BITS/PACKET |
|---|---|
| Rate 1 | 171 |
| Rate 1/2 | 80 |
| Rate 1/4 | 40 |
| Rate 1/8 | 16 |
| Blank | 0 |
| Rate 1 with bit errors | 171 |
| Insufficient frame quality(erasure) | 0 |

TELEPHONE APPARATUS WITH AUDIO RECORDING FUNCTION AND AUDIO RECORDING METHOD TELEPHONE APPARATUS WITH AUDIO RECORDING FUNCTION

BACKGROUND OF THE INVENTION

1. Field of the Invention

The invention relates to a telephone apparatus with an audio recording function and its audio recording method which can preserve a response to a partner side and a message from the partner side. More particularly, the invention relates to a telephone apparatus with an audio recording function and its audio recording method which are suitable for use in a cellular phone of a cellular telephone system of the CDMA (Code Division Multiple Access) system.

2. Description of the Related Art

In recent years, many telephones having a voice memorandum function (simply referred to as a voice memo function hereinbelow) for enabling a response of an answer-phone to be informed from this side to the partner side when the user is absent or enabling a message from the partner side to be left have been brought to market. In the telephone having the voice memo function, a response of the answer-phone from the partner side can be previously recorded in case of absence. When there is a reception call from the partner side, a voice of the response of the answer-phone is reproduced and is sent to the partner side. Thus, the absence can be notified to the partner side and it is promoted to decide whether the message should be left or not as necessary. When there is a message from the partner side, the message from the partner side is accumulated in the telephone having the voice memo function. When the message from the partner side remains, the user of the telephone reproduces the message when he comes home. Thus, the user of the telephone can confirm the contents of the remaining message from the partner side in case of absence.

As such a telephone with the voice memo function, hitherto, for example, there has been known a telephone such that a drive unit of a small tape cassette is provided, a small magnetic tape cassette is set into the tape cassette drive unit of the telephone main body, and a response of an answer-phone or a voice of a message of the partner side is recorded in the small magnetic tape cassette. Hitherto, there has also been known a telephone such that a semiconductor memory is provided, a response of an answer-phone or a voice of a message of the partner side is converted into a digital signal, and the response of the answer-phone or the voice of the message of the partner side is recorded as a digital signal into the semiconductor memory.

A construction such that the voice memo function is installed in a cellular phone of a cellular telephone system is considered. As mentioned above, as telephones having the voice memo function, the telephone in which a voice is recorded in the small tape cassette and the telephone in which a voice is recorded as a digital signal into the semiconductor memory have been known. However, in the cellular phone of the cellular telephone system, it is difficult to use a magnetic tape cassette in order to realize a small size and a light weight. Therefore, in a case such that the voice memo function is installed in the cellular phone of the cellular telephone system, a construction such that the response of the answer-phone or the message of the partner side is recorded in the semiconductor memory is considered.

However, in the voice memo function using the semiconductor memory, a semiconductor memory of a large capacity is necessary in order to record for a long time. When the memory of the large capacity is installed, it becomes an obstacle for realization of a small size and a light weight and the costs rise.

OBJECTS AND SUMMARY OF THE INVENTION

It is, therefore, an object of the invention to provide a telephone apparatus with an audio recording function which can record and reproduce a voice for a long time without using a memory of a large capacity and an audio recording method of such a telephone apparatus with the audio recording function.

To accomplish the above object, according to one aspect of the invention, there is provided an audio recording method of recording a voice into a storage device, comprising: an audio processing step of compressing a non-compressed audio signal when such a signal is inputted and keeping a compressed audio signal as it is when such a compressed signal is inputted; and a storing step of storing an output derived in the audio processing step into the storage device.

According to another aspect of the invention, there is provided an audio reproducing method of reproducing a voice from a storage device, comprising: a reading step of reading a compressed signal which was stored and recorded in the storage device; and an audio processing step of receiving an output derived in the reading step, decompressing the output derived in the reading step when an output of a non-compressed audio signal is required, and keeping the output derived in the reading step as it is when an output of the compressed audio signal is required.

According to still another aspect of the invention, there is provided a transmitting method having a step of recording and reproducing a voice to/from a storage device, comprising: a compressing step of receiving a non-compressed audio signal and compressing it; a storing step of storing an output derived in the compressing step into the storage device; a reading step of reading out a compressed signal which was stored and recorded in the storage device; a modulating step of receiving an output derived in the reading step and modulating it; a high frequency signal processing step of converting an output derived in the modulating step into a high frequency signal; and a transmitting step of transmitting an output derived in the high frequency signal processing step.

According to further another aspect of the invention, there is provided a receiving method having a step of recording and reproducing a voice to/from a storage device, comprising: a receiving step of receiving a high frequency signal; a demodulating step of demodulating an output derived in the receiving step; a storing step of storing a previously compressed audio signal which is obtained from an output derived in the demodulating step into the storage device as it is; a reading step of reading out the compressed signal which was stored and recorded in the storage device; and a decompressing step of decompressing an output derived in the reading step.

According to the invention, an audio recording apparatus, an audio reproducing apparatus, a transmitting apparatus, and a receiving apparatus to accomplish the above methods are also provided, respectively.

The above and other objects and features of the present invention will become apparent from the following detailed description and the appended claims with reference to the accompanying drawings.

DETAILED DESCRIPTION OF THE PREFERRED EMBODIMENT

An embodiment of the present invention will now be described hereinbelow with reference to the drawings. The invention is suitable when it is used in, for example, a cellular phone of a cellular telephone system of the CDMA system.

The CDMA system is a system in which a carrier wave of a transmission signal is spectrum spread by using a pseudo random noise code (PN code) as a spread code and is transmitted and a pattern and a phase of a code sequence of a spread code are made different, thereby enabling a multiple access.

According to the CDMA system, a spread spectrum system is used as a communication system. In the spread spectrum system, the PN (Pseudo random Noise) code is multiplied to the carrier wave upon transmission and the carrier wave is modulated by the PN code. Since the PN code is a random code, by modulating the carrier wave by the PN code as mentioned above, its frequency spectrum is widened. Upon reception, the same PN code as that on the transmitting side is multiplied. Upon reception, when the same PN code as that upon transmission is used and their phases coincide, an inverse spread is performed.

According to the spread spectrum system, in order to inversely spread the signal upon reception, the same PN code as that on the transmitting side is necessary with respect to not only the pattern but also the phase. By changing the pattern or phase of the PN code, therefore, the multiple access can be performed. A system in which the multiple access is enabled by making the pattern or phase of the code sequence of the spread code different as mentioned above is called a CDMA system.

Figure 1:
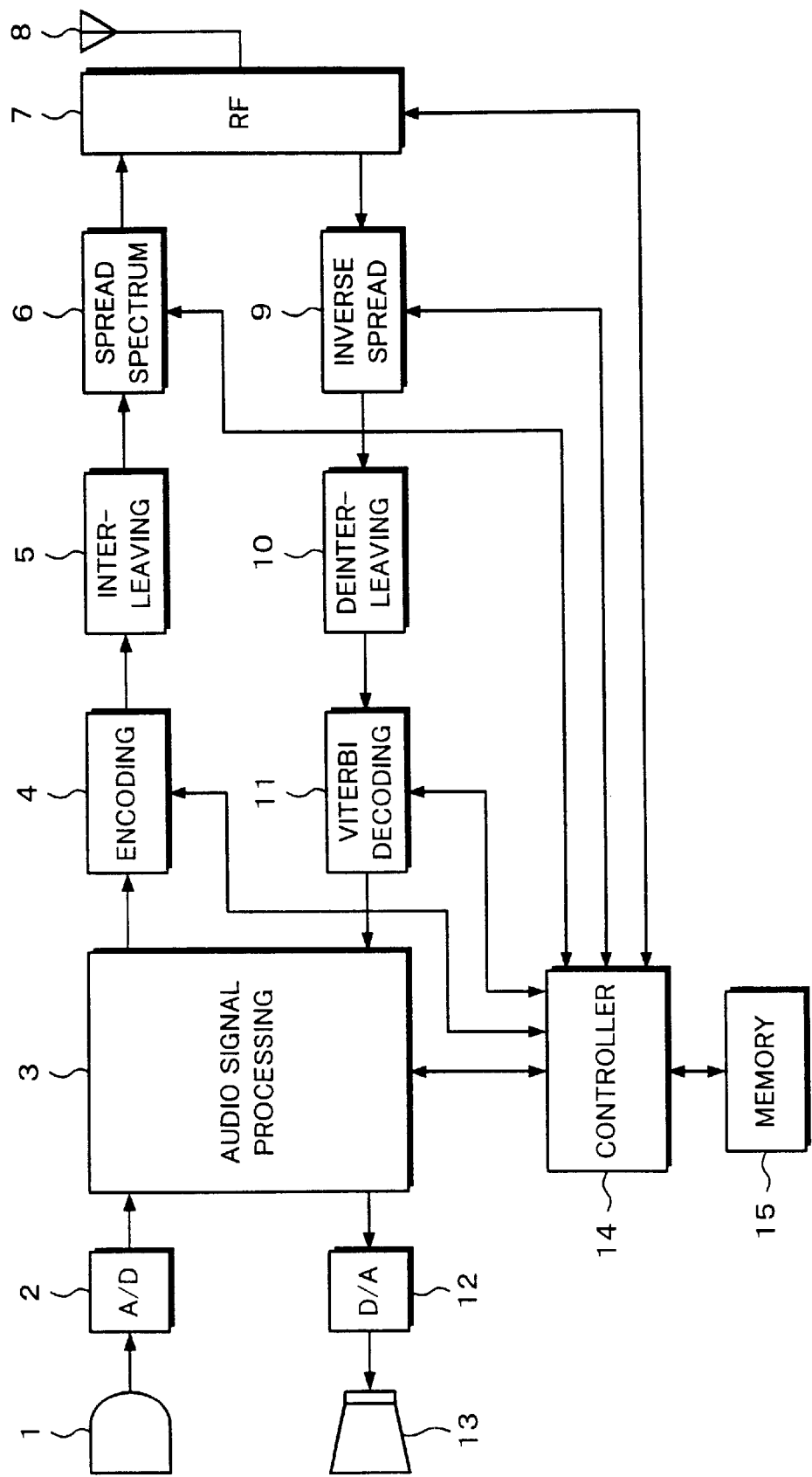
FIG. 1 is a block diagram showing an example of a cellular phone of the CDMA system to which the present invention is applied.

FIG. 1 shows an example of a cellular phone of a cellular telephone system of the CDMA system to which the invention can be applied. In FIG. 1, an audio signal is inputted to a microphone 1 upon transmission. The audio signal is supplied to an A/D converter 2 and an analog audio signal is converted into a digital audio signal by the A/D converter 2. An output signal of the A/D converter 2 is supplied to an audio signal processing circuit 3.

The inputted digital audio signal is compressed by the audio signal processing circuit 3. The audio signal processing circuit 3 is controlled by a controller 14. As a compression encoding system, various systems have been proposed. For example, a system such as QCELP (Qualcomm Code Excited Linear Prediction) such that a plurality of coding speeds can be selected in accordance with a nature of a voice of a speaker or a busy situation of a communication path can be used. According to the QCELP, four kinds of coding speeds can be selected in accordance with the nature of the voice of the speaker or the busy situation of the communication path.

An output signal of the audio signal processing circuit 3 is supplied to an error correction encoding circuit 4. An error correction code of a convolution code is added to transmission data. An output of the error correction encoding circuit 4 is supplied to an interleaving circuit 5. The transmission data is interleaved by the interleaving circuit 5. An output signal of the interleaving circuit 5 is supplied to a spread spectrum circuit 6.

A carrier signal is modulated by the spread spectrum circuit 6 and the spectrum of the signal is spread by the PN code. Since the PN code is a random code, by multiplying the PN code as mentioned above, a frequency width of the carrier signal is widened and a spread spectrum is performed. For example, a BQPSK modulation is used as a modulation system of the transmission data.

An output signal of the spread spectrum circuit 6 is supplied to an RF circuit 7. The RF circuit 7 is controlled by the controller 14. A frequency of a transmission signal is converted to a predetermined frequency. An output signal of the RF circuit 7 is power amplified and, thereafter, is supplied to an antenna 8. A radio wave from the antenna 8 is transmitted toward a base station.

Upon reception, a radio wave from the base station is received by the antenna 8. A reception signal from the antenna 8 is supplied to the RF circuit 7. The reception signal is converted into an intermediate frequency signal of a predetermined frequency by the RF circuit 7.

An output signal of the RF circuit 7 is supplied to an inverse spread spectrum circuit 9. The signal which was spectrum spread and transmitted is inversely spread by the inverse spread spectrum circuit 9 and the data is demodulated. An output signal of the inverse spread spectrum circuit 9 is supplied to a deinterleaving circuit 10.

The reception data is deinterleaved by the deinterleaving circuit 10 in correspondence to the interleaving process on the transmitting side. An output of the deinterleaving circuit 10 is supplied to a Viterbi decoding circuit 11. The Viterbi decoding circuit 11 decodes the convolution code by a soft decision and a maximum likelihood decoding. An error correcting process is executed by the Viterbi decoding circuit 11. An output signal of the Viterbi decoding circuit 11 is supplied to the audio signal processing circuit 3.

The audio signal which was compressed by, for example, the QCELP and was transmitted is decompressed by the audio signal processing circuit 3 and the digital audio signal is decoded. The digital audio signal is supplied to a D/A converter 12. The digital audio signal is converted to the analog audio signal by the D/A converter 12. The analog audio signal is supplied to a speaker 13.

A semiconductor memory 15 is provided for the cellular phone of the cellular telephone system to which the invention is applied. The memory 15 is used for a voice memo. The digital audio signal from the audio signal processing circuit 3 is stored in the memory 15 in a compression encoded form by the control of the controller 14.

A response of an answer-phone from the partner side can previously be recorded in the memory 15 in case of absence. When there is a reception call from the partner side, a voice of the response of the answer-phone is read out from the memory 15 and the voice of the response of the answer-phone is sent to the partner side. Thus, a situation that the user is absent at present is informed to the partner side and a judgment about whether a message should be left or not is promoted to the partner side a s necessary. When there is a message from the partner side, the message from the partner side is stored in the memory 15. When the message from the partner side remains, the message in the memory 15 is reproduced after the user returns home. Thus, the user of the telephone can confirm the contents of the message left from the partner side in case of absence.

If the user wants to leave a response on this side to the partner side in case of absence, an audio signal of the response on this side to the partner side is inputted from the microphone 1, is converted into a digital signal by the A/D converter 2, is compressed by the audio signal processing circuit 3, and is stored in the memory 15. As mentioned above, the response on this side to the partner side is converted into the digital signal, is compressed, and is stored into the memory 15. When there is a reception call, the data in the memory 15 is read out and is sent to the RF circuit 7 through the encoding circuit 4, interleaving circuit 5, and spread spectrum circuit 6, is transmitted from the antenna 8, and is sent to the partner side. Thus, the response on this side is transmitted to the partner side.

In case of leaving the message from the partner side in case of absence, the signal from the partner side is received by the antenna 8 and is supplied to the audio signal processing circuit 3 through the RF circuit 7, inverse spread spectrum circuit 9, deinterleaving circuit 10, and Viterbi decoding circuit 11. The audio signal from the audio signal processing circuit 3 is stored as it is in the memory 15 in a compression encoded form.

In case of reproducing the message stored in the memory 15, the output data of the memory 15 is supplied to the audio signal processing circuit 3. The audio signal which was compressed by the QCELP and stored is decompressed by the audio signal processing circuit 3 and the digital audio signal is decoded. The digital audio signal is supplied to the D/A converter 12. The digital audio signal is converted to the analog audio signal by the D/A converter 12. The analog audio signal is supplied to the speaker 13.

Figures 2, 3:
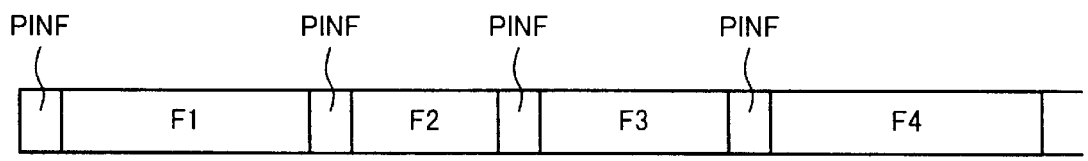
FIG. 2 is a schematic diagram for use in explanation of QCELP.
FIG. 3 is a schematic diagram for use in explanation of an example of a cellular phone of the CDMA system to which the invention is applied.

In the QCELP, the audio signal is divided into audio signals on a 20-msec unit basis and is compressed to packets of four kinds of coding rates (for example, four kinds of rates of 9.6 kbps, 4.8 kbps, 2.4 kbps, and 1.2 kbps) in a range from the coding rate 1 to the coding rate ⅛ as shown in FIG. 2 in accordance with an audio energy. As mentioned above, in the QCELP, a frame of a small audio energy can be compressed-into a short packet. Therefore, if the audio signal compressed by the QQELP is stored into the memory 15, a memory capacity occupied can be reduced and a time for the voice memo can be extended as compared with the case where the audio signal is converted into the digital signal and is stored as it is into the memory 15.

Since the QCELP is based on the variable rate, in case of storing the audio signal compressed by the QCELP into the memory 15, packet identification information to identify the kind of packet is necessary. In the QCELP, there are four kinds of coding rates and, further, as packet types, there are three kinds (Blank, Rate 1 with bit errors, Insufficient frame quality) which are used in the case where a receiving state in the demodulator is bad and a frame error occurs. Thus, there are total seven kinds of rates. Consequently, at least three bits are needed as packet ID information.

As shown in FIG. 3, the audio data is divided into frames F1, F2, F3, . . . of the packet data of a variable length and packet ID information PINF indicative of the kind of packet of each frame is arranged at the head of each of the frames F1, F2, F3, . . . . A size of each of the frames F1, F2, F3, . . . is set to a variable length. As packet ID information PINF, information corresponding to at least three bits is prepared. In case of reproducing the voice stored in the memory 15, the output data of the memory 15 is supplied to the audio signal processing circuit 3. The audio signal which was compressed by the QCELP and stored is decompressed by the audio signal processing circuit 3. In this instance, the audio signal is decompressed by using the packet ID information PINF added to each of the frames F1, F2, F3, . . . .

As mentioned above, in the cellular phone to which the invention is applied, the digital audio signal from the audio signal processing circuit 3 is stored in the memory 15 for voice memo in the compression encoded form. In case of reproducing the audio signal which was compressed and stored in the memory 15, the compressed and stored audio signal is decompressed by the audio signal processing circuit 3. As mentioned above, since the audio signal is compressed by the variable length encoding and stored into the memory 15 for voice memo, the memory capacity can be reduced without deteriorating a sound quality and a recording time. Since the audio signal is compressed by a system similar to the compression system of the CDMA system and is stored into the memory 15 for voice memo, there is no need to add any special circuit and a circuit scale and costs are not increased.

In the above embodiment, although the audio signal has been compressed and decompressed by using the QCELP, the compressing system is not limited to the QCELP but the invention can be also similarly applied to other compressing systems.

According to the invention, the digital audio signal is stored into the memory for voice memo in the compression encoded form. Therefore, the data amount which is required for the voice memo is reduced and the improvement of the recording time and the reduction of the memory capacity can be realized without deteriorating the sound quality. Since the audio signal is compressed by the system similar to the compressing system of the CDMA system and is stored into the memory for voice memo, there is no need to add any special circuit and the circuit scale and costs are not increased.

The present invention is not limited to the foregoing embodiments but many modifications and variations are possible within the spirit and scope of the appended claims of the invention.

What is claimed is:

1. An audio recording method in a portable cellular telephone for recording an audio signal into a storage device, comprising the steps of:

receiving said audio signal transmitted in a Code Division Multiple Access (CDMA) system, wherein said audio signal is compressed using a Qualcomm Code Excited Linear Prediction (QCLEP) system into a plurality of variable size packets using a plurality of coding speeds in response to an audio energy of said audio signal;

demodulating said audio signal to generate a demodulated audio signal; and storing said demodulated audio signal into said storage device in said QCELP compressed form.

2. An audio reproducing method in a portable cellular telephone for reproducing an audio signal from a storage device, comprising the steps of:

reading said audio signal out of said storage device, wherein said audio signal was transmitted to said portable cellular telephone in a Code Division Multiple Access (CDMA) system and compressed using a Qualcomm code Excited Linear Prediction (QCELP) system into a plurality of variable size packets using a plurality of coding speeds in response to an audio energy of said audio signal and stored in said QCELP compressed form;

supplying said audio signal read from said storage device to a QCELP decoder for decompressing processing; and decompressing and reproducing said audio signal.

3. An audio recording apparatus in a portable cellular telephone for recording an audio signal into a storage device, comprising:

a receiver for receiving said audio signal transmitted in a Code Division Multiple Access (CDMA) system, wherein said audio signal is compressed using a Qualcomm Code Excited Linear Prediction (QCLEP) system into a plurality of variable size packets using a plurality of coding speeds in response to an audio energy of said audio signal;

a demodulator for demodulating said audio signal to generate a demodulated audio signal; and a controller for storing said demodulated audio signal into said storage device in said QCELP compressed form.

4. An audio reproducing apparatus in a portable cellular telephone for reproducing an audio signal from a storage device, comprising:

a controller for reading said audio signal out of said storage device, wherein said audio signal was transmitted to said portable cellular telephone in a Code Division Multiple Access (CDMA) system and was compressed using a Qualcomm code Excited Linear Prediction (QCELP) system into a plurality of variable size packets using a plurality of coding speeds in response to an audio energy of said audio signal and stored in said QCELP compressed form, wherein said controller supplies said audio signal read from said storage device to a QCELP decoder for decompressing processing, and decompresses and reproduces said audio signal.

* * * * *